United States Patent [19]

Fukuchi

[11] 4,273,462
[45] Jun. 16, 1981

[54] JOINT UNIT
[75] Inventor: Shigeki Fukuchi, Tokyo, Japan
[73] Assignee: Metako Kigyo Co., Ltd., Tokyo, Japan
[21] Appl. No.: 53,725
[22] Filed: Jul. 2, 1979
[51] Int. Cl.[3] .......................... F16D 1/00; F16B 7/00; E04B 7/08
[52] U.S. Cl. ................... 403/171; 403/178; 403/231; 403/292; 403/405
[58] Field of Search ............... 403/171, 173, 176, 178, 403/231, 292, 405

[56] References Cited
U.S. PATENT DOCUMENTS

| | | | |
|---|---|---|---|
| 3,211,481 | 10/1965 | Cadovius | 403/171 |
| 3,255,721 | 6/1966 | Peterschmidt | 403/176 X |
| 3,532,369 | 10/1970 | Reilly | 403/176 |
| 3,600,825 | 8/1971 | Pearce | 35/18 A |
| 3,648,404 | 3/1972 | Ogsbury | 46/29 |
| 3,666,298 | 5/1972 | Reilly | 403/176 |
| 3,893,774 | 7/1975 | Hashioka | 403/171 |
| 4,076,432 | 2/1978 | Glaser | 403/171 X |
| 4,161,375 | 7/1979 | Murphy | 403/406 X |
| 4,161,375 | 7/1979 | Murphy | 403/406 X |

FOREIGN PATENT DOCUMENTS

| | | | |
|---|---|---|---|
| 687592 | 6/1964 | Canada | 403/171 |
| 815767 | 3/1966 | Canada | 403/171 |

Primary Examiner—Werner H. Schroeder

[57] ABSTRACT

A joint unit for coupling hollow frame element including one connection members which are provided with at least two or more separated contacting sections with an inner wall of the frame element wherein one of the contacting sections is twisted against the other contacting section to obtain a function of torsional moment for rigid fit of the connection member to the frame element at more than two positions therein.

13 Claims, 20 Drawing Figures

JOINT UNIT

TECHNICAL FIELD OF THE INVENTION

This invention relates to an improved joint unit as well as end closure for hollow members such as pipes or tubes which are generally used for assembling or building frames of various shape such as collapsible furniture, game installations including jungle gyms, show cases or display racks for articles, scaffolding, temporary buildings and the like.

BACKGROUND ART

A joint is used to interconnect or couple two or more pipes of angular, circular or square shape in section when the necessary frames are combined or assembled to built desired planar or solid objects or buildings. The joint is often fixed by means of a screw which is generally excellent for its reliability, releasability and adaptability. Nevertheless such a fastening means is inconvenient and troublesome in operation assembling or disassembling operation of the pipe frames. To avoid such in operation inconvenience in operation, a forced insertion of the connection members of the joint into open ends of the frame pipes is conventionally employed. For example, the joint is provided with two or more tapered connection members each having an external configuration which is similar to an internal configuration of the pipe and adapted to be forcedly inserted into the open ends of the pipes for interconnection thereof as shown in FIG. 1. According to the joint of this type, a rigid contact between the root of the tapered connection member and an internal wall of the pipe may be ensured. However, the rigid connection between the connection member and the pipe is relaxed after a lapse of time, particularly as a result of a continuous vibration applied thereto, since the joint with the tapered connection member is somewhat tilted downwardly as illustrated by the dotted line in FIG. 1.

In order to attain a more stable coupling between the connection member of the joint with the pipe, the tapered end of the connection member is sometimes provided with an expansion or an enlarged terminus of substantially the same size and configuration as the inner diameter and configuration of the pipe so that the connection member is made into rigid contact with the inner wall of the pipe at the two points, namely at the enlarged terminal and the root of the connection member as shown in FIG. 2. However, even according to this, two point contact undesired relaxation still occurs if the pipes intended to be interconnected are made of deformable materials such as plastic or aluminum.

In another conventional connection, a square connection member is inserted into a square pipe and is subsequently turned to obtain rigid contacts between each of the corners of the connection member and each inner side walls of the pipe as shown in FIGS. 3 and 4. This known way is, however, still ineffective in pipe of deformable material such as aluminum alloy.

SUMMARY OF THE INVENTION

It is therefore a general object of the invention to provide an improved joint unit as well as end closure which may be effectively applied to the frame pipe of even deformable material.

In accordance with the invention, an improved joint unit includes a connection member which is provided with at least two contacting sections with the internal wall of the pipe and one of the contacting sections is substantially twisted against the other contacting section. The joint may include more than two connection members which may be directed to a multiple directions such as opposite directions, radial directions or three dimensional directions as desired according to the purposes of assembling.

BRIEF DESCRIPTION OF THE DRAWINGS

Other objects and advantages of the invention will be more fully described with reference to the accompanying drawings illustrative of preferred embodiments of the invention in which.

BEST MODE FOR CARRYING OUT THE INVENTION

Figure 1:
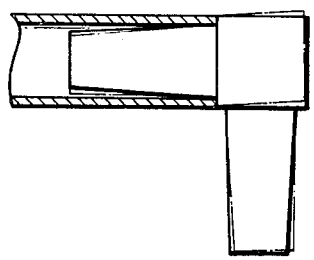
FIG. 1 is a lateral view in partially sectioned of the known joint showing with the dotted line a little tilting motion of the joint.
Figure 2:
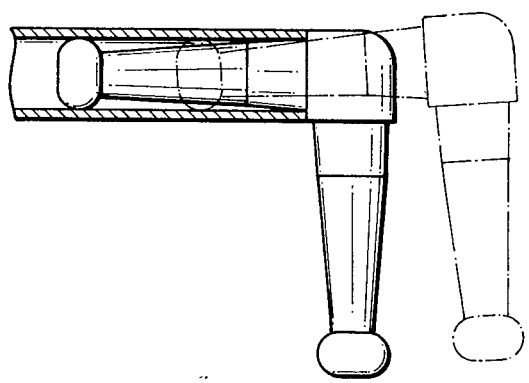
FIG. 2 is a lateral view in partially sectioned of another known joint showing with the dotted line a process of insertion of the connection member of the joint unit into the pipe.
Figure 4:
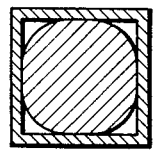
FIGS. 3 and 4 are cross sectional views of known connection members with the pipes.
Figure 3:
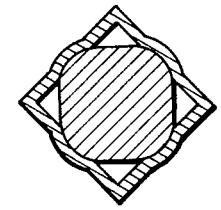
Figure 5:
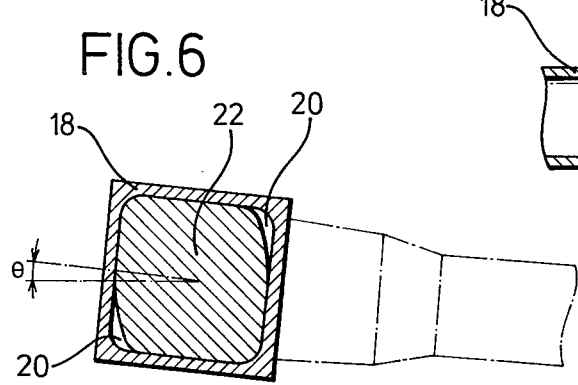
FIG. 5 is a lateral view in partially sectioned of the pipe joint unit in accordance with the present invention.

In FIG. 5, a joint unit according to the invention is formed of a base support 10 of square section from which a connection member 12 is extended with two separated contacting sections 14 and 16 of substantially the same size and shape as those of the inner wall of a pipe 18. The base support 10 may be of a spherical form enabling the support of a number of connection members directing in any desired direction according to the purposes of assembling the frame pipes. It will be appreciated that the joint which has a single connection member may be merely used as an end closure for an open end of the pipe. The pipes to be connected to one another may be of any shape in section except a circular shape and may have opposite hollow ends with a filled intermediate section.

The top contacting section 16 is twisted about the longitudinal axis of the connection member 12, partially or as a whole relative to the root contacting section 14 with a torsion angle $\sigma$. The root contacting section 14 is also tapered in relation to the axis of the connection member 12, facilitating a smooth insertion into the pipe 18. The connection member 12 may be of any desired shape in section including circular, square and angular forms and may preferably be tapered to obtain a desired torsion effect between the top contacting section 16 and the root contacting section 14 when the connection member 12 is inserted into the pipe 18. The connection member 12 may be provided with a convenient enforcement means such as a rib.

The root contacting section 14 is preferably maintained in the same phase as that of the base support 10 so that the frame pipe 18 does not receive any torsional motion when the root contacting section 14 is inserted into the pipe 18. The root contacting section 14 is of the size which permits a rigid fit with the pipe end. While, the top contacting section 16 is of the size which permits a loose fit with the pipe end for facilitating a smooth insertion of the connection member 12 into the pipe.

Figure 6:
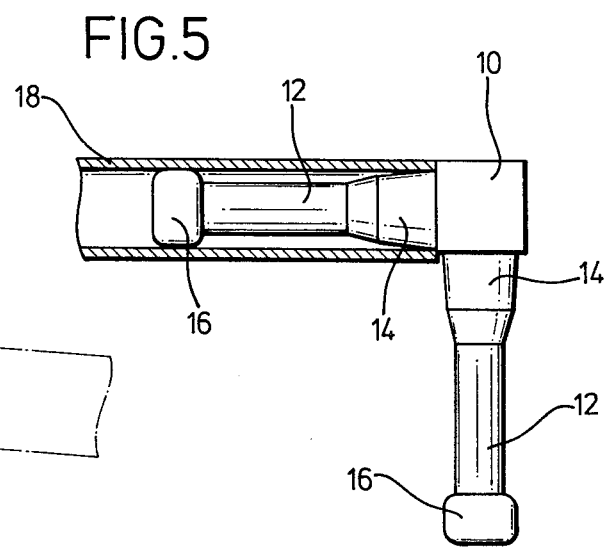
FIG. 6 is a cross sectional view of the top contacting section of the connection member inserted into the pipe having a rectangular section.

The top contacting section 16 may be of the same configuration as that of the inner wall of the pipe end, and is twisted about the longitudinal axis relative to the root contacting section 14 with a predetermined torsion angle of approximately 0.7–0.8 degree when the pipe 18 is made of aluminum alloy. Alternatively, the top contacting section 16 may be shaped into a rhomboidal form with an apparent torsion angle of approximately 3–4 degree against the root contacting section 14 which permits the provision of running spaces 20, 20 when the rhombodidal contacting section 22 is inserted into the pipe 18 as shown in FIG. 6.

When the top contacting section 16 is inserted into the pipe in conformity with the configuration of the inner wall of the pipe 18 and the inserting operation is further advanced to permit the following insertion of the root contacting section 14 into the pipe end, the top contacting section 16 receives through the connection member 12 a torsional moment in the clockwise direction whereas the root contacting section 14 receives a torsional moment in the counterclockwise direction. The counterclockwise torsional moment is absorbed by the root contacting section 14 since the rigid fit is ensured between the root contacting section 14 and the pipe end as hereinbefore described. While the clockwise torsional moment applied to the top contacting section 16 urges the latter to turn around the axis of the connection member 12 providing rigid contact of the opposite faces of the top contacting section 16 with the opposite inner walls of the pipe 18 and leaving running spaces 20, 20 as shown in FIG. 6.

Figure 7:
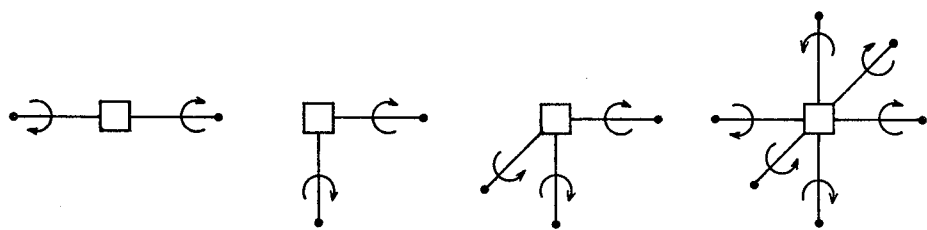
FIG. 7 is a pictorial view illustrative of various modes of the torsional moments applied to the top contacting section of the connection member.

In FIG. 7, there are illustrated various examples of the directions of the torsional moments applied to the top contacting section 16 of the joint units of various kinds.

Figure 8:
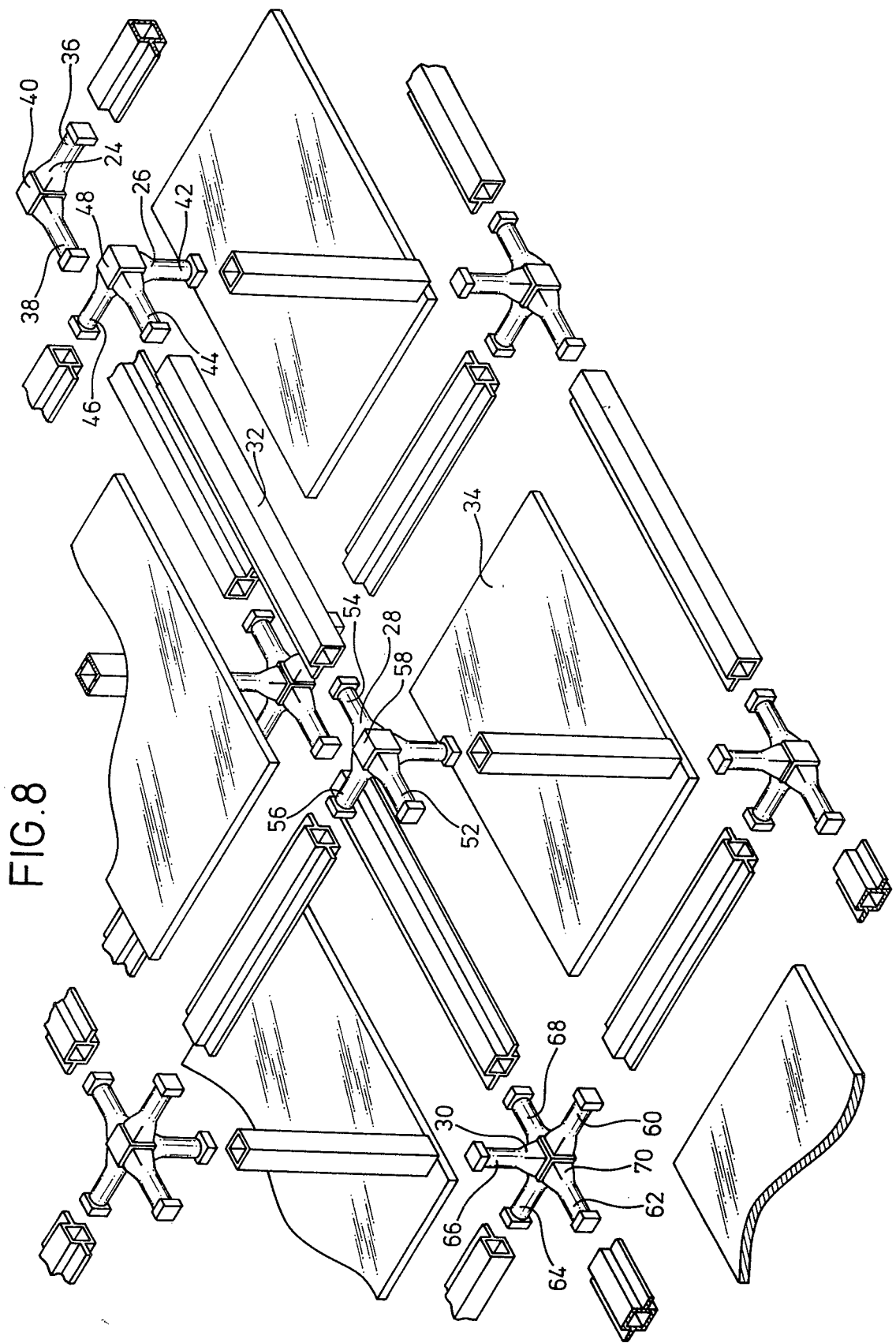
FIG. 8 is a pictorial view showing various examples of the joint unit according to the invention in connection with the frame matters to be coupled for assembling.

In FIG. 8, there are illustrated several examples of the joint units 24, 26, 28, 30 formed according to the present invention in connection with the pipe frame 32 connected to a plate 34. The joint 24 has two connection members 36 and 38 extending in the normal directions from a base support 40. The joint 26 has three connection members 42, 44 and 46 extending in the three dimensional directions from a base support 48. The joint 28 is provided with four connection members 50, 52, 54 and 56 extending to four directions from a base support 58. The joint 30 includes five connection members 60, 62, 64, 66 and 68 extending to five different directions from a base support 70.

Figure 9:
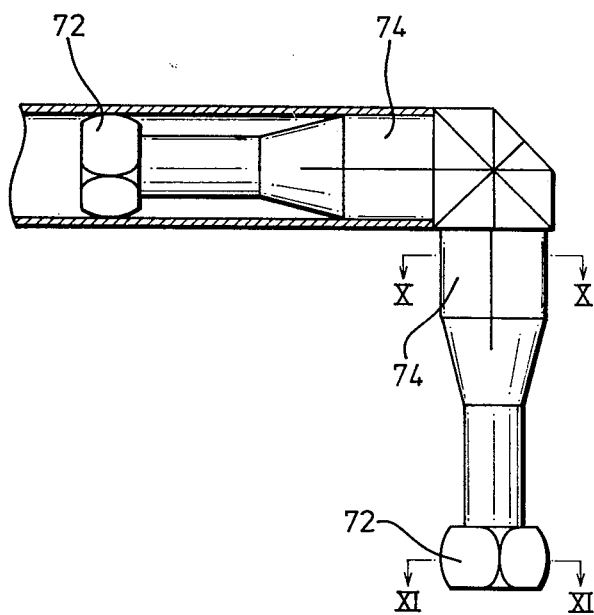
FIG. 9 is a lateral view partially sectioned of the joint unit of another embodiment according to the invention.
Figure 10:
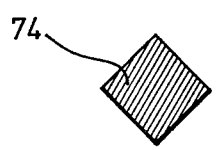
FIG. 10 is a cross-sectional view of the root contacting section taken along the line X—X of FIG. 9.
Figure 11:
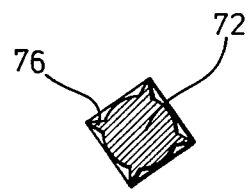
FIG. 11 is a cross sectional view of the top contacting section taken along the line XI—XI of FIG. 9.

In the embodiment illustrated in FIGS. 9 to 11, the top contacting section 72 is of the shape different from that of the root contacting section 74 as clearly shown in section in FIGS. 10 and 11. Namely, the root contacting section 74 is shaped into a rectangular form whereas the top contacting section 72 is shaped into a circular form with four projections 76 provided around the periphery of the circular contacting section. In this embodiment, the joint is designed to be used for the frame pipe of rectangular form in section which is turned for approximately 45 degree against the plane.

Figure 12:
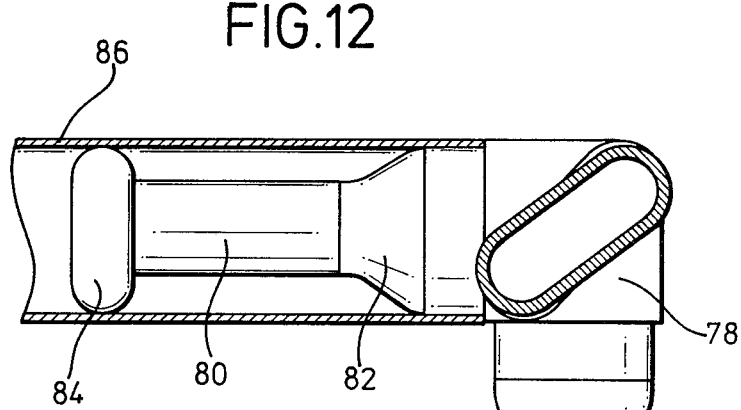
FIG. 12 is a lateral view partially sectioned of the joint of a further embodiment according to the invention.
Figure 13:
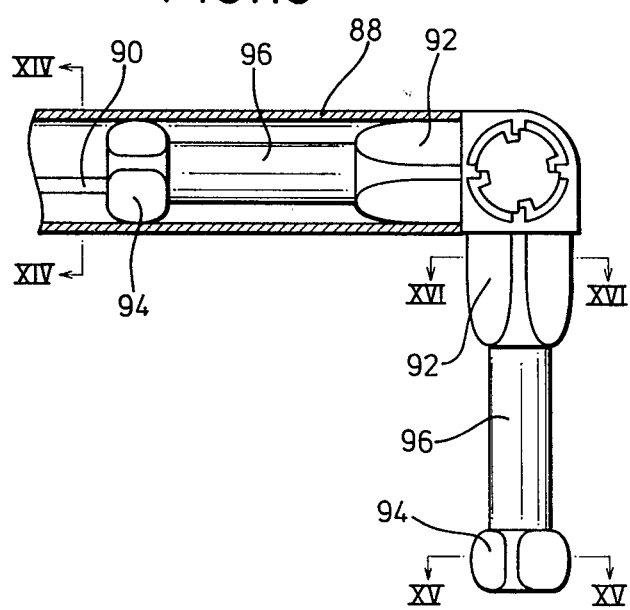
FIG. 13 is a lateral view partially sectioned of the joint of still a further embodiment according to the invention.
Figure 14:
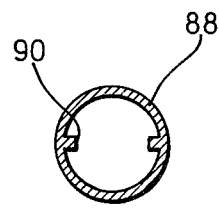
FIG. 14 is a cross sectional view of the pipe taken along the line XIV—XIV of FIG. 13.

In the embodiment of FIG. 12 there extends, from a base support 78 two connection members 80, 80 each of which is provided with a tapered root contacting section 82 and a top contacting section 84 having elliptical sections. This joint unit is especially used for the frame pipe 86 having an elliptical section.

Figure 15:
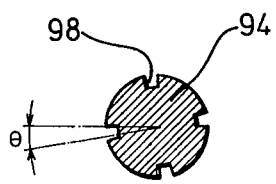
FIG. 15 is a cross sectional view of the top contacting section taken along the line XV—XV of FIG. 13.
Figure 16:
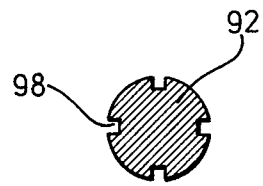
FIG. 16 is a cross sectional view of the root contacting section taken along the line XVI—XVI of FIG. 13.

In the embodiment of FIGS. 13 to 16, the joint according to the invention is designed to be applied for the frame pipe having a circular section. Namely, the pipe 88 is internally provided with one or more projecting rim 90 whereas a root contacting section 92 and a top contacting section 94 mounted around a connection member 96 with a predetermined distance are provided with one or more channels 98 for receiving the rim 90 when the connection member 96 is inserted into the circular pipe 88. Of course, the top contacting section 94 is twisted against the root contacting section 92 with a predetermined angle $\theta$ as shown in FIGS. 15 and 16.

Figure 17:
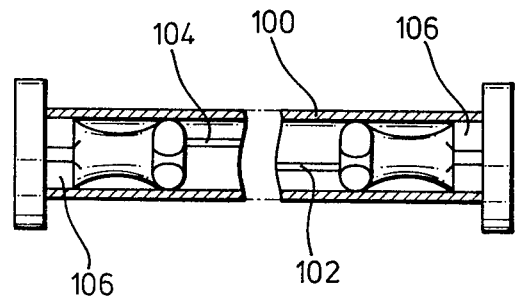
FIG. 17 is a sectional view of the joint similar to that of FIG. 13 but applied as an end closure.

In the embodiment of FIG. 17, the joint of the same structure as that shown in FIGS. 13 to 16 is used as an end closure for the frame pipe 100 having the internal rims 102 and 104.

In this embodiment, the root contacting section 106 is not tapered to ensure a complete sealing with the pipe.

Figure 18:
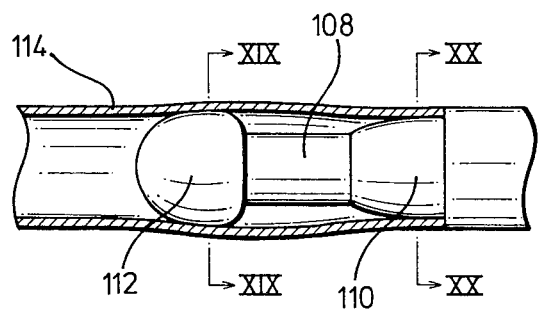
FIG. 18 is a sectional view of the joint of another embodiment according to the invention.
Figure 19:
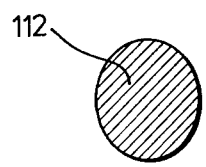
FIG. 19 is a cross sectional view taken along the line XIX—XIX of FIG. 18.
Figure 20:
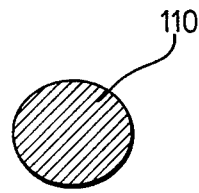
FIG. 20 is a cross sectional view taken along the line XX—XX of FIG. 18.

In the embodiment illustrated in FIGS. 18 to 20, a connection member 108 is provided at a predetermined distance from a root contacting section 110, with a top contacting section 112; the root and top contacting section having an oval cross section in the horizontal and vertical direction respectively as seen in FIGS. 19 and 20. The pipe 114 is generally formed substantially cylindrical, although it is required to have some irregular form in cross section along its length so that the root contacting sections 110 and the top contacting sections 112 when inserted into the pipe 114 with the torsional moments do not slide on an inner wall of the pipe 114.

As hereinbefore fully described, in accordance with the joint unit of the present invention, the rigid fit of the joint with the frames to be coupled are performed at two separated points along the length of the frame under the function of the torsional moment applied thereto which lasts semipermanently before the joint unit is released from the frame even through any unexpected or accidental impact even after a continuous vibration is applied to the frames coupled by the joint of the invention.

Further, the joint unit of the invention may include in selection a number of connection members of various shapes to accord with the configurations of the frame matters to be coupled and fulfill various purposes for assembling and arranging the frames.

Without further elaboration, the foregoing will so fully illustrate the invention that others may, by applying the current or future knowledge, readily adapt the same for use under various conditions of service.

What is claimed is:

1. A joint unit for hollow frame elements comprising a base support and at least one connection member extended therefrom, said connection members being provided with at least two axially separated contacting sections having peripheral contours adapted to engage the inner wall of the frame elements, at least one of the contacting sections being substantially twisted about the axis of the connection member relative to the other contacting section to thereby skew said contours relative to each other.

2. A joint unit as claimed in claim 1, wherein the separated contacting sections are of substantially the same size and configuration and the contacting section remote from the base support is twisted relative to the contacting section abutting the base support.

3. A joint unit as claimed in claims 1 or 2, wherein a torsion angle of the contacting section remote from the base support relative to the contacting section abutting the base support is approximately 0.7 to 0.8 degrees.

4. A joint unit as claimed in claim 1, wherein the contacting section abutting the base support is of a size which permits a rigid fit with the frame element whereas the contacting section remote from the base support is of a size which permits a loose fit with the frame element.

5. A joint unit as claimed in claim 1, wherein the contacting section abutting the base support is tilted relative to the axis of the connection member.

6. A joint unit as claimed in claim 1, wherein the contacting section remote from the base support is formed in rhomboidal shape in cross-section to obtain a substantial torsion effect relative to the contacting section abutting the base support.

7. A joint unit as claimed in claim 6, wherein an apparent torsion angle of the contacting section remote from the base support relative to the contacting section abutting the base support is approximately 3-4 degrees.

8. A joint unit as claimed in claim 1, wherein the configuration of the contacting section apart from the base support is different from that of the contacting section abutting to the base support.

9. A joint unit as claimed in claim 8, wherein the contacting section remote from the base support is provided at its circumference with one or more projections.

10. A joint unit as claimed in claim 1, wherein the contacting sections are formed into elliptical shapes in sections.

11. A joint unit as claimed in claim 1, wherein the contacting sections are provided at their circumferences with one or more channels for receiving a rib provided on an inner length of the hollow frame element.

12. A joint unit as claimed in claim 1, wherein the joint unit includes only one connection member to provide a function of an end closure.

13. A joint unit as claimed in claim 1 wherein the contacting member abutting the base support has an oval section laid in horizontal direction and the contacting member remote from the base support has an oval section standing vertically.

* * * * *